(12) United States Patent
Hartog et al.

(10) Patent No.: US 8,401,401 B2
(45) Date of Patent: Mar. 19, 2013

(54) POLARIZATION-DIVERSE, HETERODYNE OPTICAL RECEIVING SYSTEM

(75) Inventors: Arthur H. Hartog, Martyr Worthy (GB); Dominic Brady, Freemantle (GB); Maxwell R. Hadley, Lyndhurst (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 632 days.

(21) Appl. No.: 12/578,652

(22) Filed: Oct. 14, 2009

(65) Prior Publication Data

US 2010/0092176 A1  Apr. 15, 2010

Related U.S. Application Data

(60) Provisional application No. 61/105,066, filed on Oct. 14, 2008.

(51) Int. Cl.
*H04B 10/06* (2006.01)
(52) U.S. Cl. ............ 398/205; 398/25; 398/28; 398/98; 398/152; 398/204; 398/207
(58) Field of Classification Search ............... 398/9–33, 398/79, 98, 152, 202–208; 385/12, 31; 356/477, 356/491; 359/135
See application file for complete search history.

(56) References Cited

U.S. PATENT DOCUMENTS

| | | | |
|---|---|---|---|
| 4,718,121 A * | 1/1988 | Epworth | ........................ 398/203 |
| 5,282,188 A | 1/1994 | Gage | |
| 6,285,806 B1 * | 9/2001 | Kersey et al. | .................... 385/12 |
| 6,801,320 B2 | 10/2004 | Szafraniec | |
| 7,081,959 B2 | 7/2006 | Waagaard et al. | |
| 2003/0058499 A1 * | 3/2003 | Reingand et al. | .............. 359/135 |
| 2004/0033017 A1 * | 2/2004 | Kringlebotn et al. | ............ 385/31 |
| 2004/0070766 A1 * | 4/2004 | Szafraniec | ..................... 356/477 |
| 2005/0232531 A1 | 10/2005 | Hadley et al. | |
| 2006/0018586 A1 * | 1/2006 | Kishida | ........................... 385/12 |
| 2007/0223078 A1 | 9/2007 | Yao et al. | |
| 2007/0236700 A1 * | 10/2007 | Yun et al. | ....................... 356/491 |
| 2008/0316494 A1 | 12/2008 | Hartog et al. | |
| 2009/0008536 A1 | 1/2009 | Hartog et al. | |

FOREIGN PATENT DOCUMENTS

| | | |
|---|---|---|
| GB | 2126820 A | 3/1984 |
| WO | 2008012498 A1 | 1/2008 |
| WO | 2008020170 A2 | 2/2008 |
| WO | 2008023143 A1 | 2/2008 |
| WO | 2008040939 A2 | 4/2008 |
| WO | 2007141464 A1 | 12/2008 |

OTHER PUBLICATIONS

Frigo, N. J., A. Dandridge, and A.B. Tveten, Technique for elimination of polarisation fading in fibre interferometers. Electronics Letters, 1984. 20(8): p. 319-320.
Kersey, A.D., M.J. Marrone, and A. Dandridge, Experimental investigation of polarisation-induced fading in interferometric fibre sensor arrays. Electronics Letters, 1991. 27(7): p. 563-4.
Kersey, A.D., M.J. Marrone, and A. Dandridge, Observation of input-polarization-induced phase noise in interferometric fiber-optic sensors. Optics Letters, 1988. 13(10): p. 847-849.

(Continued)

*Primary Examiner* — Li Liu

(57) ABSTRACT

To provide a polarization-diverse, heterodyne optical receiving system, a light signal is transmitted into an optical fiber having a plurality of optical sensors that are distinguishable using a multiplexing arrangement. A return light signal from the optical fiber is mixed with an optical local oscillator light signal, where the mixing outputs plural output signal portions having different polarizations. A birefringence of a particular optical sensor is determined based on the plural signal portions.

22 Claims, 5 Drawing Sheets

OTHER PUBLICATIONS

Kirkendall, C.K. and A. Dandridge, Polarization Induced Phase Noise in Fiber Optic Interferometers with Polarizer Based Polarization Diversity Receivers, in 15th Optical Fiber Sensors Conference. 2002: Portland, OR, USA. p. 375-8.

Lo, Y.-L., et al., Simultaneous absolute measurements of principal angle and phase retardation with a new common-path heterodyne interferometer. Applied Optics, 2004. 43(10): p. 2013-22.

Oka, K et al Optical Heterodyne polarimeter for studying space and time dependent state of polarisation of light, J Mod Optics, 1991, vol. 38 pp. 1567-1580.

Kirkendall et al Overview of high performance fibre-optic sensing, J Phys D: Appl Phys, 2004, 37, pp. 197-216.

* cited by examiner

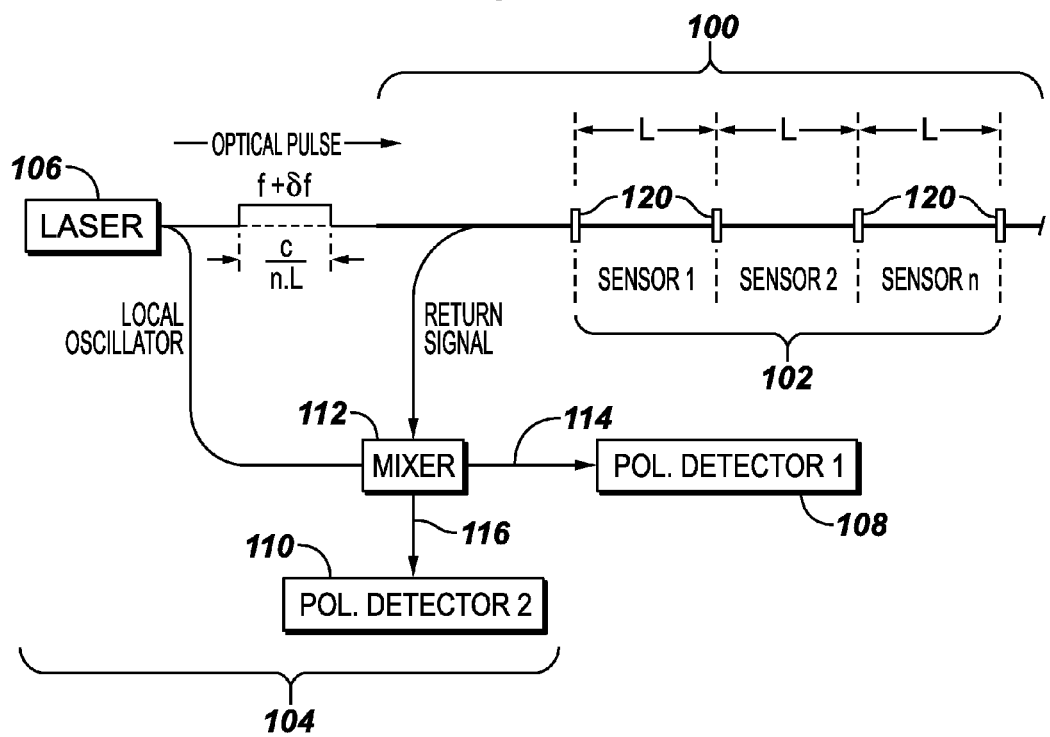
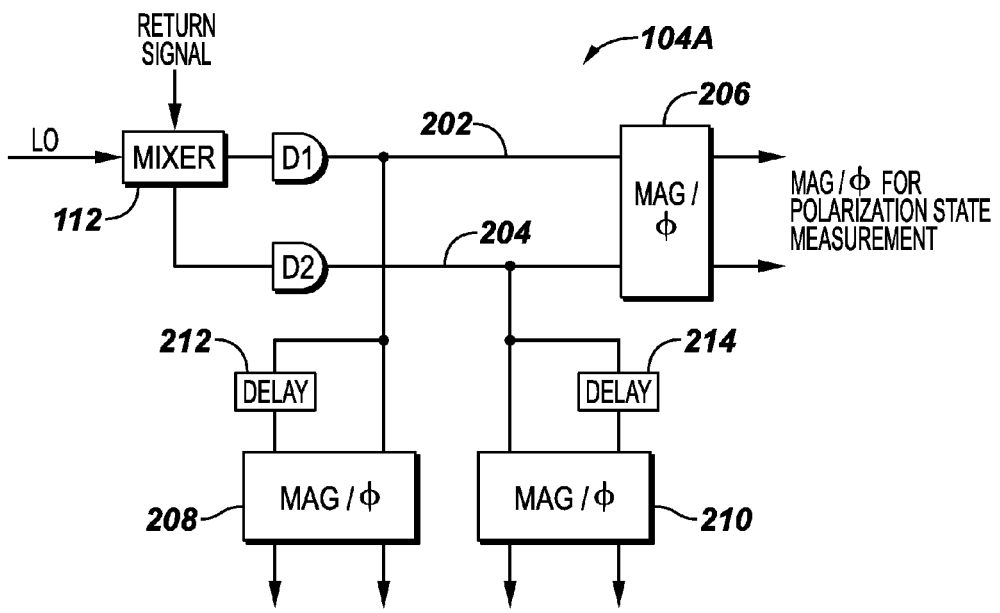

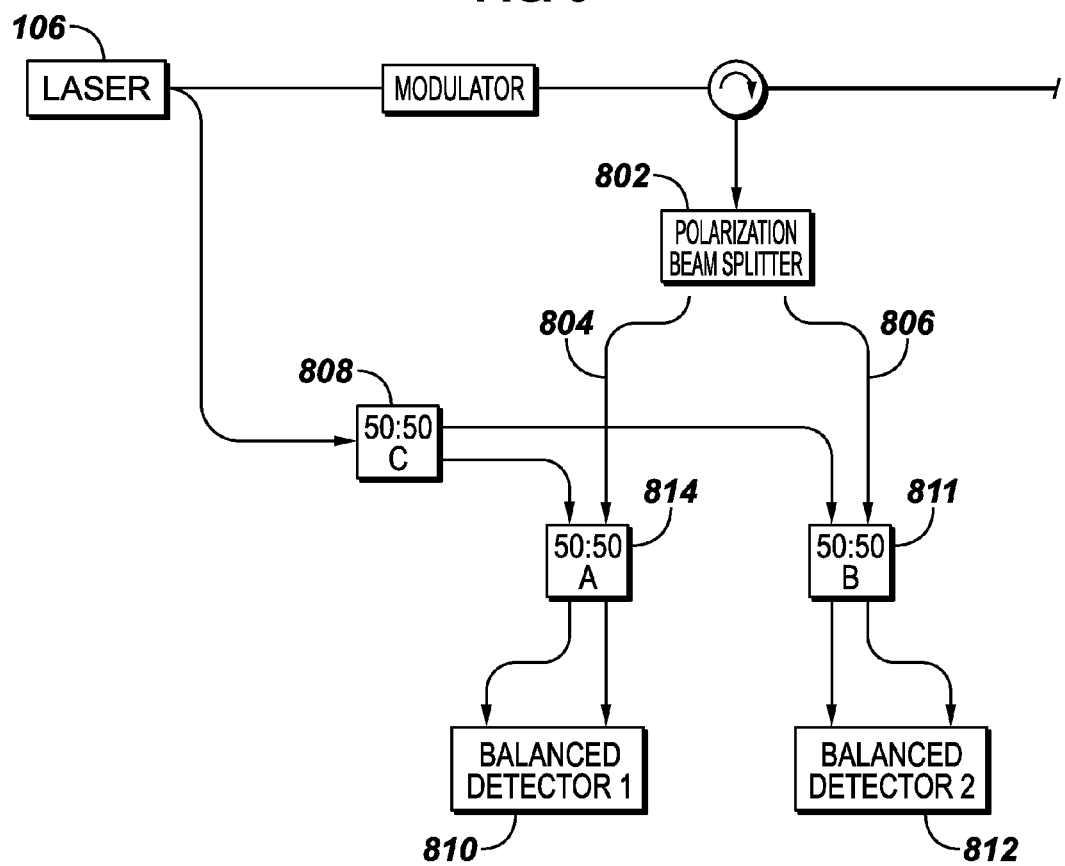

POLARIZATION-DIVERSE, HETERODYNE OPTICAL RECEIVING SYSTEM

RELATED APPLICATIONS

This application claims the benefit of U.S. Provisional Application No. 61/105,066, filed Oct. 14, 2008, the contents of which are herein incorporated by reference.

TECHNICAL FIELD

This invention relates generally to a polarization-diverse, heterodyne optical receiving system.

BACKGROUND

Optical sensing systems including optical interferometric sensors are being developed for a wide range of applications where they can offer benefits compared to conventional electrical sensor systems. These benefits include the ability to multiplex relatively large numbers of optical sensors on a single optical fiber to achieve a reduced form-factor for the optical fiber. Other benefits include immunity to electromagnetic interference, high sensitivity, and the ability to position the interrogation system relatively far away from the sensors. The interrogation system includes a light source to transmit light signals into the optical fiber, and a detection subsystem to detect light returned from the sensors.

Such optical sensing systems are often assumed to be immune to interference on the length of optical fiber between the interrogation system and the optical sensors (the downlead), even though the length of the optical fiber may be relatively long (several kilometers) and which may pass through terrain where the environment is not controlled. For a single mode system with zero birefringence, this assumption may be correct. However, in the vast majority of systems, this will not be the case for at least two reasons. First, the optical fiber itself will have some residual birefringence, although this amount may be small. Second, if an optical sensor with a reasonable form-factor is used, then the optical fiber will need to be coiled in order to reduce the space the optical fiber occupies, and this will induce birefringence into the optical fiber. In practical terms an optical sensor with birefringence has two optical paths with different lengths which can be addressed by changing the polarization launched into the optical sensor; as a result, the optical sensor output depends on the incoming polarization even if there is no change in the principal measurand (a characteristic being measured by an optical sensor). As the birefringence increases, so does the apparent sensitivity of the optical sensor to polarization.

SUMMARY

In general, according to an exemplary embodiment, a polarization-diverse, heterodyne optical receiving system is provided in which a light signal is transmitted into an optical fiber having a plurality of sensors that are distinguishable using a multiplexing arrangement. The optical receiving system is able to receive a return light signal from a particular one of the optical sensors in response to the transmitted light signal. The return light signal is mixed with an optical local oscillator light signal, where an output of the mixing includes plural output signal portions having different polarizations. Based on the plural output signal portions with different polarizations, a birefringence of an optical sensor can be measured.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 1 is a schematic diagram showing an interrogation system and an optical fiber having optical sensors, according to an embodiment;

FIGS. 2-4 are schematic diagrams of components of an interrogation system according to several embodiments;

FIG. 8 is a schematic diagram of components of an interrogation system according to another embodiment that performs balanced heterodyne detection.

DETAILED DESCRIPTION

Figure 3:
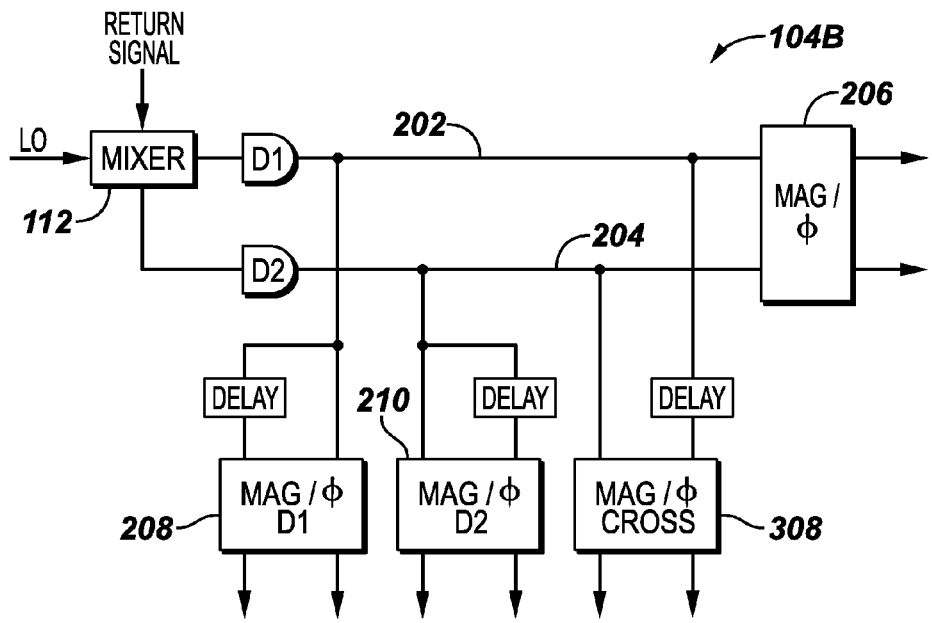

In the following description, numerous details are set forth to provide an understanding of the present invention. However, it will be understood by those of ordinary skill in the art that the present invention may be practiced without these details and that numerous variations or modifications from the described embodiments may be possible. In the specification and appended claims: the terms "connect", "connection", "connected", "in connection with", "connecting", "couple", "coupled", "coupled with", and "coupling" are used to mean "in direct connection with" or "in connection with via another element"; and the term "set" is used to mean "one element" or "more than one element". As used herein, the terms "up" and "down"; "upper" and "lower", "upwardly" and downwardly", "upstream" and "downstream"; "above" and "below"; and other like terms indicating relative positions above or below a given point or element are used in this description to more clearly describe some embodiments of the invention.

FIG. 1 illustrates an exemplary arrangement that includes an optical fiber 100 having a sensor string 102 of optical sensors (sensor 1, sensor 2 . . . sensor n). The arrangement of FIG. 1 also includes an interrogation system 104 that has a coherent light source 106 (e.g., laser light source) and a detection subsystem including detectors 108 and 110, and a mixer 112 for mixing a return optical signal from the sensor string 102 and an optical local oscillator (LO) light signal from the laser source 106. The output of the mixing output of the mixer 112 includes plural output signal portions having multiple (two or more) different polarizations. The optical LO light signal has to be incident on both detectors 108 and 110, which can be achieved, for example, with a quarter-wave plate, or by aligning the plane of polarization at about 45° to a polarization beam splitter in the mixer 112. In some implementations, the intensity of the optical LO light signal reaching each receiver 108, 110 is substantially the same.

In one embodiment, the mixing performed by the mixer 112 involves splitting (e.g., by use of a polarization beam splitter provided in the mixer 112) the return optical signal from the sensor string 102 into plural return light signal portions having different polarizations. The return light signal portions are then combined with the optical LO light signal having an appropriate polarization, where the combination produces output signal portions having the multiple different polarizations that are provided (e.g., at 114, 116) to the respective polarization detectors 108 and 110.

In another embodiment, the return optical signal from the sensor string 102 is first combined with the optical LO light signal to form a combined signal. A polarization beam splitter in the mixer 112 then splits the combined signal into two (or more) signal portions that have different polarizations (e.g., orthogonal polarizations). A first signal portion having a first polarization is provided (at 114) to the first detector 108, and the second signal portion having a second, different polarization is provided (at 116) to the second detector 110.

In some implementations, the detectors 108, 110 are optical detectors for detecting corresponding polarizations of the respective signal portions.

Although FIG. 1 shows the mixer 112 outputting two output signal portions, note that in alternative implementations the mixer 112 can output more than two output signal portions with respective different polarizations.

Based on the signal portions detected by detectors 108 and 110, the birefringence of each of the sensors in the sensor string 102 can be determined. As a result, the effect of such birefringence can be removed from measurements made by the individual sensors in the sensor string 102.

Although FIG. 1 shows the optical LO light signal as being provided by the same light source that also provides the probe signal into the optical fiber 100, it is noted that in an alternative implementation, a separate coherent light source can be used to provide light in the local oscillator path to the mixer 112, provided that the second coherent light source is coherently related to the laser source 106. A first light source is coherently related to a second light source if there is a predictable relationship between the frequency and the phase of the first and second light sources. For example, the first and second light sources can be at the same frequency or have a fixed frequency offset or even variable offset that is known.

The multiple sensors of the sensor string 102 have a multiplexed arrangement to allow distinguishing between the signals returned from such sensors. In one embodiment, the multiplexed arrangement is a time-domain-multiplexed (TDM) arrangement. A TDM arrangement provides that signals from different sensors in the sensor string 102 are processed by the interrogation system 104 at different times. In an alternative embodiment, instead of using a TDM arrangement, a wavelength-division-multiplexed (WDM) arrangement can be used, either in addition or in place of the TDM arrangement. For example, each of the sensors can be associated with a corresponding different wavelength. In alternative implementations, the multiplexed arrangement of the sensors can be based on a multiplexing scheme that discriminates among the sensors by using other techniques, such as by applying frequency-domain modulation or pseudo-random code modulation.

In some embodiments, the optical fiber 100 is a single-mode optical fiber. The interrogation system 104 is able to analyze the effects of polarization and birefringence in real time to measure the birefringence of each of the sensors in the sensor string 102, and the state of polarization of the light interrogating each of the sensors. In this way, the sensitivity of the sensors to polarization due to their birefringence can be determined. This polarization sensitivity can then be subtracted from an actual measurement made by each of the sensors. In this way, the measurement of non-zero-birefringence optical sensors can be truly separated from the effects of polarization evolution in the downlead.

Each optical sensor in the sensor string 102 is defined by two successive reflectors 120. Stated differently, the optical fiber between each pair of reflectors provides a corresponding optical sensor of the stream 102. The length of each optical sensor is represented as L, which is the length of the optical fiber between the reflectors. In some implementations, each reflector 120 can be a fiber Bragg grating (FBG), which reflects light of particular wavelengths and transmits all others. In alternative implementations, other types of reflectors can be used. Although each optical sensor is shown to have the same length L in FIG. 1, it is noted that at least some of the optical sensors can have different lengths in other implementations.

Each optical sensor operates to change the optical path length between two points corresponding to reflectors 120, under the influence of a measurand. The measurand is usually converted to a strain on the optical fiber, which can be measured interferometrically using a variety of different techniques. The sensitivity of each sensor is controlled by the length of the optical fiber exposed to the strain.

In one application, the sensor string 102 and a portion of the optical fiber 100 can be deployed in a wellbore, such as a wellbore associated with the production of target fluids (e.g., hydrocarbons, fresh water). Alternatively, the wellbore can be used for the injection of fluids, such as water or carbon dioxide. In alternative implementations, the sensor string 102 can be used for other applications.

Individual pulses of light, each with a pulse length equal to or less than double the distance between reflectors (L) (in some examples) are launched into the optical fiber 100 from the laser source 106. Alternatively, an "optical pulse" can be sent that is made up of simultaneous pulses launched on orthogonal polarizations each having different modulation frequencies. Upon reaching a sensor, a portion of the optical pulse is reflected as the return signal that is provided back to the interrogation system. The return light signal is mixed at the mixer 112 with the optical LO light signal, where the mixer 112 outputs two signal portions with two different polarizations that are provided to respective detectors 108, 110.

The example shown in FIG. 1 shows a single light pulse on a single polarization. In alternative implementations, multiple optical pulses can be transmitted into the optical fiber 100, where the multiple optical pulses can be sent simultaneously or at different times. The multiple optical pulses can have different frequencies and polarizations.

The polarization of the optical pulse that is launched into the optical fiber 100 may in some implementations be varied by using a polarization modulation device that receives the optical pulse from the laser 106 and transmits the modified optical pulse into the optical fiber 100.

In this way, the interrogation system 104 is considered a polarization-diverse, heterodyne detection interrogation system (or receiving system). Heterodyne detection of a return light signal from an optical fiber refers to detection that is based on mixing the return light signal with a reference light signal (the LO light signal discussed above). The polarization-diverse feature of the interrogation system refers to the feature of splitting the combined (mixed) signal (return light signal mixed with reference LO light signal) into multiple signal portions of different polarisations.

As further shown in FIG. 1, the frequency (f) of the light source 106 is shifted by an amount δf prior to the optical pulse being launched into the optical fiber 100. The frequency shift may be achieved, for example, by using an acousto-optic modulator (AOM, also known as a Bragg cell or acousto-optic deflector). The AOM can be operated in the first order, but higher diffraction orders may be used in other instances, for example to increase the frequency shift. Other mechanisms of creating the probe pulse and frequency shifting can be employed, such as electro-optic modulators. The frequency shifting function can also be accomplished in the local oscillator path and it is thus not necessary to carry out the frequency-shifting and modulation functions in a single device, although this is convenient in certain cases. The frequency shifting, although not strictly necessary, is convenient in that it allows signals that result from the combination of reflected signals from the reflectors and the local oscillator to be distinguished from light originating from either the LO or the return signal path only. It also allows the relative optical phase of various signals to be measured conveniently in the electrical domain.

In some embodiments, a single optical pulse on two orthogonal polarizations suffices for the reading of each optical sensor, such that a pair of pulses of slightly different frequencies does not have to be used for creating an electrical beat frequency from the interference at the detector of light reflecting from the first pulse at the $(N+1)^{th}$ reflector and light from the second pulse reflecting at the $N^{th}$ reflector.

FIG. 2 shows a schematic diagram of an interrogation system 104A according to an embodiment. As shown, the optical LO light signal and return signal (returned from the optical fiber in response to reflection of the light pulse sent by the light source) are mixed at the mixer 112. The output signals of the mixer 112 are directed to two separate detectors D1 and D1, one for each of two orthogonal polarization states. The detectors D1 and D2 correspond to the detectors 108 and 110 in FIG. 1. In one implementation, these polarization states are linear, but they need not be. The optical LO light signal is arranged to illuminate the two detectors substantially equally. The fraction of the return signal reaching each detector D1 or D2 depends on the birefringence of the download (the sensor string 102) and the sensors through which the return signal has propagated for a given time of arrival. Not shown in FIG. 2 are the preamplifiers, electrical filters, and amplifiers that may be desirable for conditioning signals output by the detectors D1 and D2 prior to further processing.

The electrical signals 202 and 204 output by the respective detectors D1 and D2 are presented to circuits and/or signal processing units 206, 208, and 210 (each marked Mag/ϕ) that for two inputs, provide the relative magnitude and phase between the signals. Each of the signal processing units 206, 208, and 210 is referred to as a magnitude and phase comparison stage. The first magnitude and phase comparison stage 206 compares the magnitude and phase of signals 202, 204 arriving at a given time and provides the information used for assessing the state of polarization of light returning from each reflector for which a sample is acquired. One example of an analog circuit that can be used to implement the magnitude and phase comparison stage 206 is the AD8302 device supplied by Analog Devices, Inc of Norwood, Mass., USA.

The other magnitude and phase comparison stages 208, 210 provide, for each of the two orthogonal polarization states, a comparison of the magnitude and phase of the light returning from adjacent reflections. This is achieved by comparing a signal connected directly from a detector output (including, if appropriate, the signal conditioning) and a delayed version of that signal, the delay being substantially equal to the time taken by the pulse to travel between adjacent reflectors. The magnitude and phase comparison stage 208 compares signal 202 with a delayed version (as delayed by delay unit 212) of the signal 202, and the magnitude and phase comparison stage 210 compares signal 204 with a delayed version (as delayed by delay unit 214) of the signal 204.

The outputs of each magnitude and phase comparison stage include a first output indicating a difference in magnitude between the input signals being compared, and a second output indicating a difference in phase between the input signals being compared. In this way, it is possible to measure the phase between reflectors. While in principle a single magnitude and phase comparison stage should be sufficient for this purpose, in practice, variations of the state of polarization mean that, if the phase is measured only on one polarization, it is quite possible for the signal to fade.

FIG. 3 shows an interrogation system 104B according to another embodiment, which is the same as interrogation system 104A of FIG. 2 except that a third magnitude and phase comparison stage 308 (Mag/ϕ Cross) has been added, which compares the signal output (204) from D2 with a delayed version of the signal output (202) from D1. This last measurement by the magnitude and phase comparison stage 308 addresses the possible cases where most of the signal returning from a particular reflector is detected by detector D2, but the signal returning from a previous reflector is largely detected at detector D1.

Figure 4:
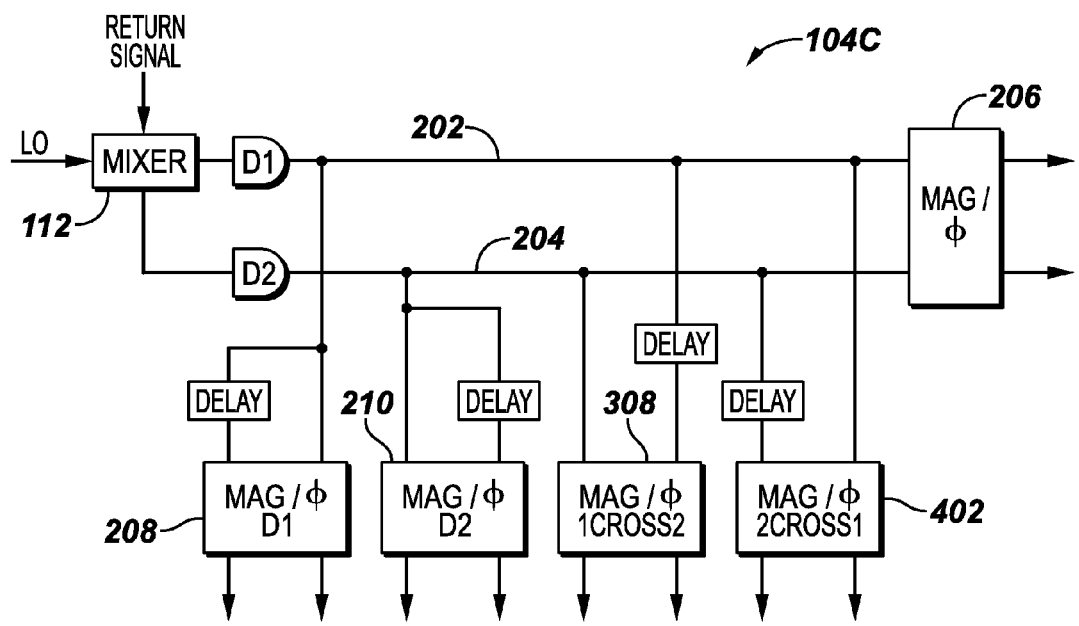

In yet another embodiment, as shown in FIG. 4, an interrogation system 104C includes the circuitry of FIG. 3 plus another comparison stage 402 (Mag/ϕ2cross1) to compare the signal from D1 with a delayed version of the signal from D2. While the additional measurements of FIGS. 3 and 4 involve a slightly increased number of components to acquire the signals and also the logic to decide which of these to use (or how to combine this information), such additional measurements help reduce the effect of fading without any increase in the complexity of the optics. In fact, if both cross-polarization phase measurements are made, a worst-case scenario for fading only reduces the signal by a factor of 2½.

The following provides an explanation of how the components described above can be used to produce output information of interest, including the birefringence of each optical sensor.

An electric representation ($E_S$) of the return signal can be expressed as follows, where α and κ define its state of polarization on the Poincaré sphere:

$$E_S := A_S \cdot e^{i \cdot (\omega t + 2\pi f \cdot t + \phi_S)} \left( \frac{\cos(\alpha_S)}{e^{i \cdot k_S} \cdot \sin(\alpha_S)} \right), \qquad \text{(Eq. 1)}$$

where $\phi_S$ is the phase of the optical sensor, $\alpha_S$ is the angle of principal light, and $A_S$ is an amplitude factor to arbitrarily describe the return from a given reflector in the sensing string.

In FIG. 2, the sensing of the magnitude and phase (Mag/ϕ) for the polarization state measurement (by magnitude and phase comparison stage 206) provides, for each reflector, information described in the final term of Eq. 1, i.e., data which defines the state of polarization of the incident light at each reflector, the reflector being identified from the time at which its reflection reaches the detector.

Then, by using a similar expression for the local oscillator which (approximately equally) illuminates both detectors D1 and D2 in FIG. 2, it can be shown that the signal received on each detector from the first reflector will be:

$$D1 := A_{lo} \cdot A_S \cdot e^{i \cdot (2 \cdot \pi \cdot f \cdot t + \phi_{lo} + \phi_S)} \cdot \cos(\alpha_S), \text{ and} \quad \text{(Eq. 2)}$$

$$D2 := A_{lo} \cdot A_S \cdot e^{i \cdot (2 \cdot \pi \cdot f \cdot t + \phi_{lo} + \phi_S)} \cdot e^{i \cdot (\Delta \kappa_S)} \cdot \sin(\alpha_S), \quad \text{(Eq. 3)}$$

where $A_S$ is an amplitude factor to describe the return from a given reflector in the sensing string, $A_{lo}$ is a similar factor for considering the local oscillator amplitude, and $\phi_{lo}$ is the phase of the LO light signal. The two results of Eqs. 2 and 3 are enough to determine the state of polarization at this point (the reflector under consideration) in the system, P1, and by inference the same can be determined for each of the returned reflections, P(n). If a strictly linear system is assumed, then each of the lengths of optical fiber between successive reflectors can be considered as an arbitrary waveplate, with an arbitrary rotation angle to the last section. Hence the relationship between any two results is given by:

$$P2 := M_{sensor} \cdot P1, \quad \text{(Eq. 4)}$$

where the transfer matrix, $M_{sensor}$, describes the rotation and appropriate phase shifts, and P1 is a two-element vector defined as:

$$P_1 := A_{lo} \cdot A_s \cdot e^{j(2 \cdot \pi \cdot f \cdot t + \phi_{lo} + \phi_s)} \cdot \begin{pmatrix} \cos(\mu_s) \\ e^{j(\Delta \kappa_s)} \cdot \sin(\alpha_s) \end{pmatrix}, \quad \text{(Eq. 5)}$$

Each sensor, when interrogated on its principal axes, has a transfer matrix of the form:

$$J_{sensor}(\sigma, \phi) := \begin{pmatrix} e^{i\phi} \cdot e^{i\frac{\sigma}{2}} & 0 \\ 0 & e^{i\phi} \cdot e^{-i\frac{\sigma}{2}} \end{pmatrix}, \quad \text{(Eq. 6)}$$

where $\sigma$ represents the birefringence of the sensor and $\phi$ the phase shift of the sensor (common to both axes). It is the phase shift $\phi$ that is the desired output of the sensor.

However, the principal axes of the sensor are in general different from those of the polarization-selecting detectors and the change of orientation ($\theta$) may be represented by a rotation:

$$R(\theta) := \begin{pmatrix} \cos(\theta) & -\sin(\theta) \\ \sin(\theta) & \cos(\theta) \end{pmatrix}. \quad \text{(Eq. 7)}$$

As a result, $M_{sensor}$ is give by $$M_{sensor}(\theta) := R(-\theta) \cdot J_{sensor} \cdot R(\theta). \quad \text{(Eq. 8)}$$

The matrix $M_{sensor}$ contains information on the phase delay through the sensor, as well as its birefringence. Given measurements of P1 and P2, then the matrix $M_{sensor}$ that transforms one into the other provides all the information required to deduce the phase delay (and incidentally, also the birefringence of the sensor).

It can be shown that with appropriate constraints on the solution, the phase delay, combined with phase-sensitive measurements on both of the received polarizations, is sufficient to determine a transfer matrix of the sensor. Once this has been measured, then the effects of the downlead can be isolated from that of the sensor and signal fidelity can be restored.

In addition, Eqs. 2 and 3 also carry information on the phase of the reflection before and after passage through a particular sensor by sampling D1 and D2 at times corresponding to returns from a reflector immediately prior and one immediately following the sensor of interest. So by measuring not only the state of polarization before and after the sensor, but also the phase between at least one polarization before and after the sensor, the phase delay of the sensor as well as its birefringence can be determined. This allows the phase change induced by the measurand to be determined independently of the birefringence of the sensor or that of the downlead.

Because the phase as well as the amplitude of the reflected light is measured (due to the heterodyne acquisition), in principle a single interrogating pulse is sufficient to determine the phase.

Alternatively, it may be necessary to launch two successive optical pulses at differing states of polarization to allow for the eventuality that the pulse arrives at the sensor exactly on a principal axis, in which case no information regarding the birefringence of the sensor is available.

One of two approaches can be used to derive desirable information. First, Eqs. 2 and 3 can be solved to calculate the state of polarization. Additionally, the phase of the sensor can be obtained directly by solving Eq. 4 for the sensor phase $\phi_S$ using the phase data between successive reflectors as well as the information of the state of polarization of each reflection.

Second, the polarization information can be separated from the phase information. In this way, the system can solve for the birefringence of the sensor first and then apply that information into an equation which incorporates the phase and birefringence information (which can be entered explicitly now) and solve for the sensor phase. One benefit of the second approach is that where the birefringence evolves significantly slower than the phase (the most common case), the birefringence result can be filtered to improve the quality of the information fed into the equation for phase.

FIG. 1 shows a serial reflective array topology. However, embodiments may not be limited to this illustrative example. In alternative embodiments, the techniques described can also be applied to other topologies, such as ladder networks, among others.

Figure 5:
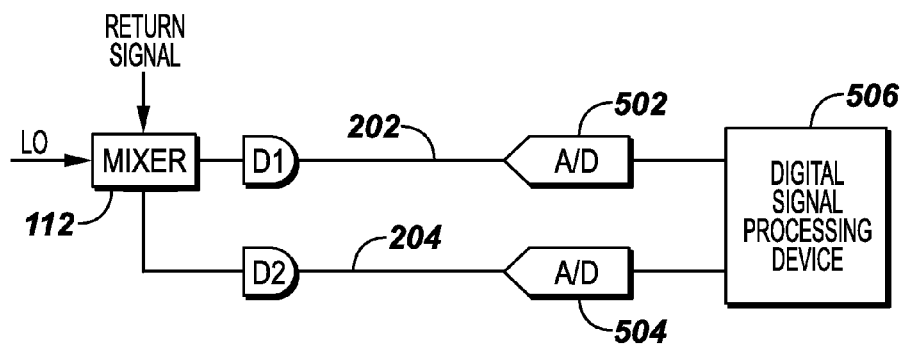
FIG. 5 is a schematic diagram of components of an interrogation system that employs a digital signal processing device, according to another embodiment.

The phase and magnitude determination described above has been illustrated as an analog function. However, it is also possible to perform the phase and magnitude determinations in the digital domain, as illustrated in FIG. 5 (again, circuitry for amplifying, filtering and conditioning the detector output has been omitted for clarity). Here, instead of passing instances of the detector outputs to analog circuits in order to measure their relative magnitude and phase, the outputs of the detectors D1 and D2 are digitized by respective analog-to-digital converters 502, 504 at a rate sufficient that these quantities can be deduced from the digital data. The digitized data streams are passed to a digital signal processing device, which can be a dedicated piece of hardware (such as a DSP processor or a programmable logic device) or a multi-purpose microprocessor. Thus for each detector, a time series is acquired which contains bursts at $\delta f$, in which each burst corresponds to a reflector. Each burst can be evaluated by the signal processing device to provide an amplitude and a phase relative to some arbitrary reference.

This amplitude and phase, combined as a single complex number, form one element of a Jones vector describing the polarization state of the received light incident at the mixer 112. The two detector channels provide the two elements of the Jones vector. Using measurements of the received Jones vectors from the two reflectors immediately before and after a sensor, (the 'reference' and 'sensor' reflectors, respectively) under the conditions of two orthogonal transmitted pulse polarizations allows the sensor phase to be determined, as will now be described.

The (normalized) Jones vectors of the two launched polarization states is defined as:

$$\left(E_X = \begin{pmatrix} 1 \\ 0 \end{pmatrix}, E_Y = \begin{pmatrix} 0 \\ 1 \end{pmatrix}\right), \quad \text{(Eq. 9)}$$

The light received from the reference reflector has the Jones vector given by:

$$E_r = J_U J_D E_0, \quad \text{(Eq. 10)}$$

where $E_0$, is the launch polarization (one of $E_X$, $E_Y$) and $J_U$, $J_D$ are the Jones matrices of the upload and download, respectively. The download includes the entire optical path from the polarization switch to the reflector, and the upload includes the entire optical path from the reflector to the mixer 112 in the interrogatory system. Some of the optical path elements lie within the interrogator itself, some in the fiber to the sensing array. Some part, but not all, of these two paths will be common.

Light received from the sensor reflector has passed twice through the sensor. Its Jones vector is given by:

$$E_s = J_U J_S J_D E_1, \quad \text{(Eq. 11)}$$

where $E_1$ is the launch polarization, not necessarily the same as $E_0$, and $J_S$ is the Jones matrix corresponding to the round trip through the sensor.

The elements of $J_S$ describe the attenuation and phase shift undergone by each of the two orthogonal linear polarization states, and the coupling between them. The eigenvectors of the Jones matrix are the Jones vectors of the two polarization eigenstates, which will propagate unchanged, without cross-coupling, through the sensor. The eigenvectors are not necessarily orthogonal. The (complex) eigenvalues of $J_S$ are the attenuations and phase shifts undergone by the two polarization eigenstates. The sensor phase is defined as the average of the two phase shifts, or equivalently the argument of the geometric mean of the two eigenvalues, which is equal to half the argument of the determinant. It is desired to find the sensor phase from the measured Jones vectors $E_r$ & $E_s$.

The product E (which is a scalar value) is formed as follows:

$$E = E_r^* E_s = E_0^* J_D^* J_U^* J_U J_S J_D E_1, \quad \text{(Eq. 12)}$$

where the asterisk denotes the Hermitian conjugate operator.

The determinant of the matrix product in (5) is given by:

$$|J_D^* J_U^* J_U J_S J_D| = |J_D^*||J_U^*||J_U||J_S||J_D| \quad \text{(Eq. 13)}$$

$$= |J_D|^*|J_U^*|^*|J_U||J_S||J_D|.$$

However, the product C*C, where C is a complex scalar such as the determinant of a matrix, is always real, thus it is noted that:

$$\angle |J_D^* J_U^* J_U J_S J_D| = \angle |J_S|, \quad \text{(Eq. 14)}$$

i.e., the argument of this determinant is the same as that of the sensor Jones matrix. Hence, if the value of this determinant can be found, then the sensor phase can be found.

Defining $$S = J_D^* J_U^* J_U J_S J_D = \begin{pmatrix} s_{11} & s_{12} \\ s_{21} & s_{22} \end{pmatrix},$$

Eq. 12 is rewritten as:

$$E_r^* E_s = E_0^* S E_1 \quad \text{(Eq. 15)}$$

$$= E_0^* \begin{pmatrix} s_{11} & s_{12} \\ s_{21} & s_{22} \end{pmatrix} E_1$$

$$= (e_{0x}^* \ e_{0y}^*) \begin{pmatrix} s_{11} & s_{12} \\ s_{21} & s_{22} \end{pmatrix} \begin{pmatrix} e_{1x} \\ e_{1y} \end{pmatrix}$$

$$= e_{0x}^* s_{11} e_{1x} + e_{0x}^* s_{12} e_{1y} + e_{0y}^* s_{21} e_{1x} + e_{0y}^* s_{22} e_{1y}.$$

Note that all the quantities in Eq. 15 are complex. To calculate the determinant of S, the system has to find the values of all four of its elements. Since $E_0$ and $E_1$ are the two launch polarizations, they are under control. In each of $E_X$, $E_Y$ one of the two elements is identically zero. Alternate pulses are launched with $E_X$ and $E_Y$ polarizations. Selection of the appropriate pairs of measured sensor and reference reflector Jones vectors allows all four complex matrix elements to be found from two successive transmitted pulses. This assumes the matrix S remains substantially constant between two successive pulses.

$E_{rX}$ represents the measured Jones vector from the reference reflector, with the launch polarization in the 'X' plane, and similarly for the other cases. The four elements of S are:

$$s_{11} = E_X^* S E_X = E_{rX}^* E_{sX}$$

$$s_{12} = E_X^* S E_Y = E_{rX}^* E_{sY}$$

$$s_{21} = E_Y^* S E_X = E_{rY}^* E_{sX}$$

$$s_{22} = E_Y^* S E_Y = E_{rY}^* E_{sY}$$

The determinant is then given by:

$$\det(S) = s_{11} \cdot s_{22} - s_{12} \cdot s_{21} \quad \text{(Eq. 16)}$$

$$= E_{rX}^* E_{sX} \cdot E_{rY}^* E_{sY} - E_{rX}^* E_{sY} \cdot E_{rY}^* E_{sX},$$

and the sensor phase is given by half the argument of this complex value.

Note that det(S) is not sensitive to the order of the X and Y measurements. Thus, a new value of sensor phase may be calculated at each pulse.

In effect, the digital acquisition approach provides all of the outputs of FIG. 4, while using only two acquisition channels. In general, the acquisition rate required in the digital approach is higher than when the magnitude and phase are extracted using analog circuitry, the output of which is then digitized; however, in the latter approach many more digitization channels are required.

A further benefit of the approach according to some embodiments is that a very narrow optical frequency can be selected through electrical (or digital) filters placed after the detectors. As a result, it is possible to launch more than one pulse (each at a slightly different carrier frequency) into the sensor array and then separate the results after optical-to-electrical conversion. This then allows the signal-to-noise ratio to be improved and/or the effective pulse repetition frequency to be increased (and in turn the ability to track fringes of the sensors at a higher rate and thus improve the dynamic range of the system). In the digital domain, this is particularly simple to implement using digital filters to provide separate data channels for each probe frequency.

Alternatively, or in conjunction with the above technique, the two orthogonal polarizations may be launched simultaneously using different modulation frequencies such that they can be acquired simultaneously. This is an alternative embodiment to one transmitting alternate pulses with orthogonal polarizations.

Figure 6A:
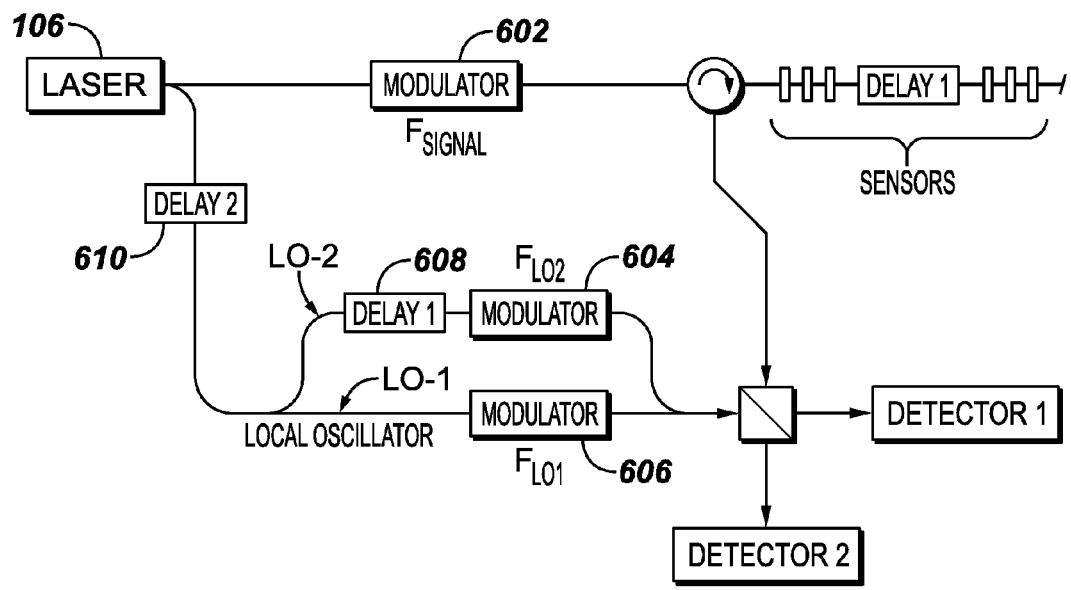
FIGS. 6A and 6B are schematic diagrams of components of interrogation systems according to yet further embodiments.

FIG. 6A shows an alternative configuration that can be used where the local oscillator optical path is modified to include multiple independent optical paths. Each of the optical paths is identified by a characteristic modulation frequency by an included modulator 604, 606. Each LO-1 and LO-2 modulator is shown here as an acousto-optic device, although there are a number of alternatives for generating uniquely identifiable signals either in the time or frequency domains depending on the architecture of the optical system. A modulator 602 can also be provided in the transmit path at the output of the laser source 106.

In this case there are two local oscillator paths, one of which includes a delay line 608 (delay 1) which is equal to the delay of the sensors. The phase of the sensor is calculated by measuring the phases of the different resultant modulation frequencies:

Sensor 1: $\phi_{reflector\ 1}(F_{signal}-F_{LO1})-\phi_{reflector\ 2}(F_{signal}-F_{LO2})$ Sensor 2: $\phi_{reflector\ 2}(F_{signal}-F_{LO1})-\phi_{reflector\ 3}(F_{signal}-F_{LO2})$, and so forth down the array.

In this way, the optical LO light signal generated during an identical period of time is used to demodulate the returning signals from the reflectors at either end of a sensor, using the different modulation frequencies to identify the delayed/direct paths. The effect of laser phase noise that would otherwise be experienced can therefore be eliminated as compared to a system that uses only a single LO path. The use of a delay line 608 in the LO-2 path which is not exactly equal to the sensor delay re-introduces phase noise in proportion to the path length difference between the LO-2 and sensor delays and is a function of the phase noise of the laser. In addition, although illustrated here are two LO paths suitable for optimally demodulating sensors with a single uniform length on the array, clearly more paths may be used to compensate for sensors that may have different optical path lengths in the same sensing array.

In addition, one may also include an overall delay line 610 (delay 2) into the LO arm which affects all LO paths equally to reduce the time delay between light launched towards and returned from the sensors, and the LO light used to demodulate the sensor light. This additional delay would be used to match the middle sensor such that either end of the array experiences the same LO frequency noise. If it is desired to minimize this, an extension of this would be to have multiple independent LO arms, each with different common delays and each containing multiple frequency arms, as illustrated in the figure above, to match the different arms of the sensing array as required.

Figure 6B:
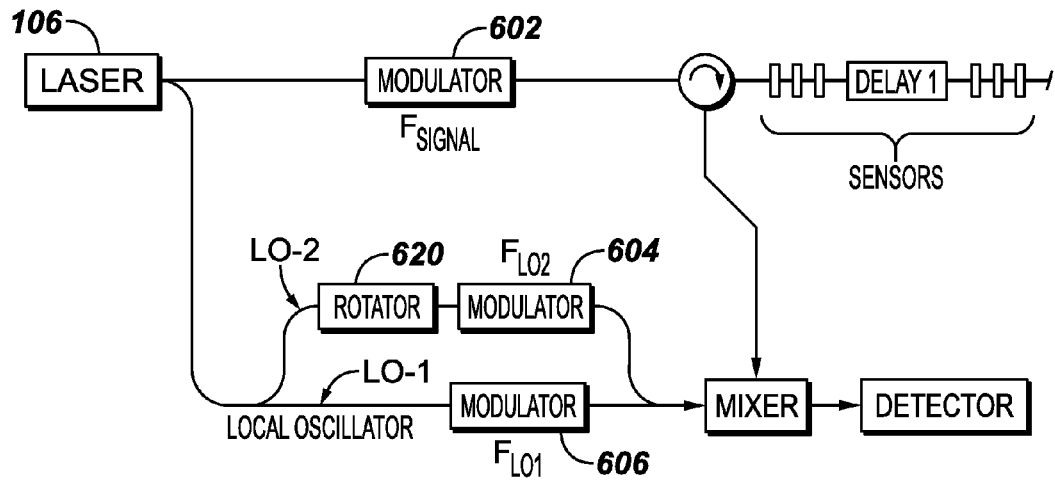

As yet another alternative, depicted in FIG. 6B, the local oscillator optical path also includes multiple independent optical paths. Each of the optical paths is identified by a characteristic modulation frequency by an included modulator 604, 606 (similar to FIG. 6A). In the FIG. 6B implementation, the polarisation of one LO path (LO-1) is orthogonal to the other LO path (LO-2), due to presence of a polarization rotator 620 in FIG. 6B. In addition, in the FIG. 6B implementation, a single detector (Detector 1) can be used without having to provide a polarization beam splitter to perform the same function as the system discussed above. This relies on the fact that interference can only occur between light portions with the same state of polarization, which therefore acts in a similar manner to the beam splitter.

Figure 7:
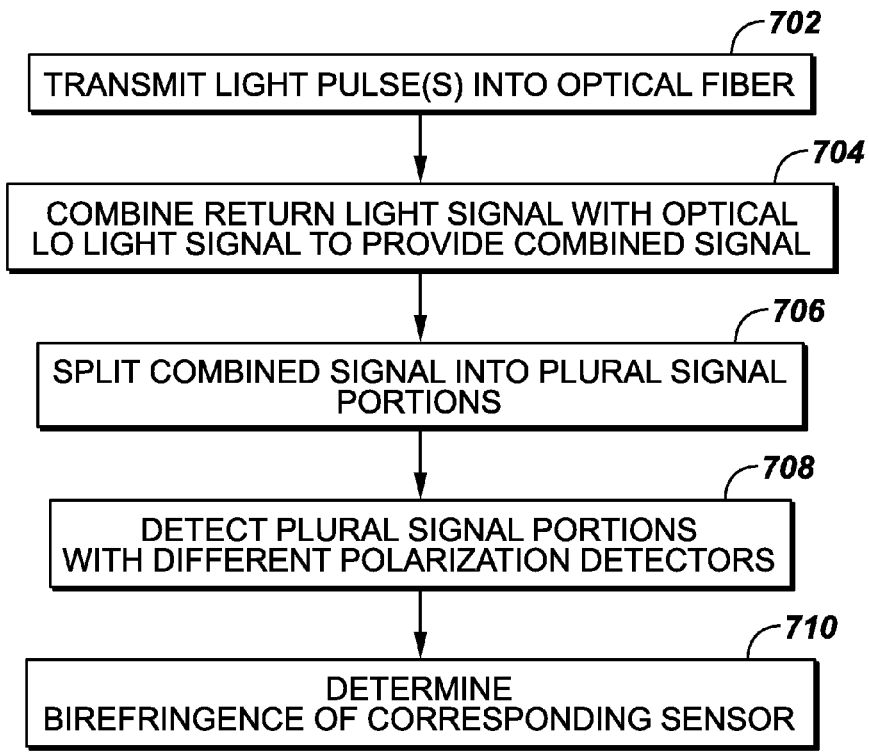
FIG. 7 is a flow diagram of a process performed by an interrogation system according to an embodiment.

FIG. 7 illustrates a flow diagram of a process performed by an interrogation system according to an embodiment. The interrogation system transmits (at 702) a light pulse into the optical fiber. A return light signal due to reflection of the transmitted light signal by a reflector corresponding to a particular optical sensor is combined (at 704) with a reference light signal (the LO light signal), to provide a combined signal. The combined signal is split (at 706) into plural signal portions of different polarizations. The plural signal portions are detected (at 708) by corresponding different polarization detectors. The output signals of the detectors are further processed by the interrogation system, as described above, to determine (at 710) the birefringence of the corresponding sensor. The determination at 710 can be performed by a digital signal processor, or by a computer under control of software. The process of FIG. 7 can be applied to determine the birefringence of each sensor in the sensor string.

Once the birefringence of each sensor is determined, the sensitivity of the sensors to polarization due to birefringence can be ascertained (e.g., such as by a computer). This polarization sensitivity can then be subtracted from an actual measurement made by each of the sensors. The subtraction of noise due to polarization sensitivity due to the birefringence of the optical sensor can be performed in real time as measurements of a target measurand (e.g., a characteristic of a wellbore such as temperature or pressure) are being made by the sensor string.

In accordance with another embodiment, a configuration as depicted in FIG. 8 is provided to address the issue of relative intensity noise (RIN). One downside to using a heterodyne detection system is that any relative intensity noise (RIN) on the laser signal is included in the return signal that causes a decrease in signal-to-noise ratio. If a system uses large LO power, as is typical in a heterodyne system, this noise can be a significant and dominating noise source. One solution to this is to use a balanced detection system that acts to reject common mode signals, such as RIN, while still detecting differential signals between the two optical ports of a balanced detector.

FIG. 8 shows a polarization beam splitter 802 that receives a return light signal from the sensor string 102. The beam splitter 802 splits the return light signal into two return signal portions 804 and 806. In addition, another splitter, in the form of a 50:50 fused fiber coupler (or other type of splitter) 808 is provided to split the optical LO light signal from the laser source 106 (the dominant RIN source). The 50:50 splitting should be done as accurately as possible 50:50 on each of the photoreceivers 810 and 812 that make up a balanced detector. 50:50 fused fiber couplers 814 and 816 are also provided to combine the split return light signal portions with respective split local LO signal portions, with the output of the couplers 814 and 816 provided to the detectors 810 and 812.

The 50:50 fused fiber couplers can be off-the-shelf components. To reduce error in the splitting provided by the coupler 808, temperature control or strain control can be provided to determine the relative splitting of the local LO light signal. Thus, a balanced heterodyne detection system with temperature control (or strain control) of the couplers 808, 814, and 816 is provided to ensure maximum common-mode-rejection-ratio. The coupling ratio can be monitored by the DC signal level on each of the photoreceivers 810 and 812 in the balanced detectors, and can be used as feedback to the temperature (or strain) control mechanism for the couplers 808, 814, and 816.

Instructions of software described above are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method of providing a polarization-diverse, heterodyne optical receiving system, comprising:
    transferring a light signal into an optical fiber having a plurality of optical sensors that are distinguishable using a multiplexing arrangement;
    receiving return light signal from a particular one of the optical sensors in response to the transmitted light signal;
    mixing the return light signal from the optical fiber with an optical local oscillator light signal, wherein an output of the mixing includes plural output signal portions having at least two different polarizations; and
    determining a birefringence of the particular optical sensor based on the plural output signal portions; and
    detecting the plural output signal portions using detectors;
    comparing, using a comparison stage, magnitudes and phases of output signals from the detectors for assessing a state of polarization of the return light signal from a reflector associated with a particular optical sensor;
    comparing, using a second comparison stage, magnitudes and phases of a first of the output signals with a delayed version of the first output signal; and
    comparing with a third comparison stage, a second of the output signals with a delayed version of the second output signal.

2. The method of claim 1, wherein the mixing comprises:
    splitting the return light signal into plural return light signal portions having different polarizations; and
    combining the return light signal portions with the optical local oscillator light signal to form the plural output signal portions having the different polarizations.

3. The method of claim 1, wherein the mixing comprises:
    combining the return light signal with the optical local oscillator light signal to form a combined light signal; and
    splitting the combined light signal into the output signal portions having the different polarizations.

4. The method of claim 1, further comprising:
    using the determined birefringence to correct a measurement of the particular optical sensor to correct for sensitivity of the particular optical sensor to polarization due to the birefringence.

5. The method of claim 1, further comprising:
    determining a state of polarization of the return light signal as a result of each of plural detectors receiving the respective signal polarizations,
    wherein determining the birefringence is based on the determined state of polarization of the return light signal.

6. The method of claim 5, wherein determining the birefringence is based on solving for a transfer matrix that contains information about a phase delay and birefringence of the particular sensor, and wherein solving for the transfer matrix is based on the determined state of polarization.

7. The method of claim 1, wherein transferring the light signal into the optical fiber having the plurality of optical sensors that are distinguishable using the multiplexing arrangement comprises transferring the light signal into the optical fiber having the plurality of optical sensors that are distinguishable using a time-domain-multiplexing (TDM) arrangement.

8. The method of claim 1, wherein transferring the light signal into the optical fiber having the plurality of optical sensors that are distinguishable using the multiplexing arrangement comprises transferring the light signal into the optical fiber having the plurality of optical sensors that are distinguishable using a wavelength-domain-multiplexing (WDM) arrangement.

9. The method of claim 1, wherein transferring the light signal into the optical fiber having the plurality of optical sensors that are distinguishable using the multiplexing arrangement comprises transferring the light signal into the optical fiber having the plurality of optical sensors that are distinguishable using one of frequency-domain-modulation or pseudo-random code modulation.

10. The method of claim 1, further comprising:
    comparing, with a fourth comparison stage, the second output signal with a delayed version of the first output signal.

11. The method of claim 10, further comprising:
    comparing, with a fifth comparison stage, the first output signal with a delayed version of the second output signal.

12. The method of claim 1, further comprising:
    detecting the plural output signal portions using detectors;
    digitizing electrical versions of output signals from the detectors that are responsive to the plural output signal portions; and
    providing the digitized versions of the output signals to a digital signal processing device to determine the birefringence of the particular optical sensor.

13. The method of claim 1, further comprising:
    providing two or more local oscillator paths associated with two or more different delays.

14. The method of claim 1, further comprising:
    determining a sensitivity of the optical sensors to polarization due to birefringence;
    receiving measurements from the optical sensors; and subtracting noise due to this sensitivity of the optical sensors from the received measurements by the optical sensors.

15. A polarization-diverse, heterodyne optical interrogation system, comprising:
an optical fiber;
a plurality of optical sensors that are distinguishable using a multiplexing arrangement;
a light source to transmit a light signal into the optical fiber for detection by the optical sensors;
a detection subsystem to:
use a mixer to mix a return light signal from the optical fiber that is responsive to the transmitted light signal with an optical local oscillator light signal, wherein the mixer is to output plural signal portions having different polarizations; and
determine a birefringence of a particular one of the optical sensors based on the plural signal portions;
wherein the detection subsystem further comprises:
detectors suitable to detect the plural output signal portions;
a first comparison stage to compare magnitudes and phases of output signals from the detectors for assessing a state of polarization of the return light signal from a reflector associated with a particular optical sensor;
a second comparison stage to compare magnitudes and phases of a first of the output signals with a delayed version of the first output signal; and
a third comparison stage to compare a second of the output signals with a delayed version of the second output signal.

16. The interrogation system of claim 15, wherein the optical fiber comprises a single-mode fiber.

17. The interrogation system of claim 15, wherein the multiplexing arrangement is based on one of: (1) a time-division multiplexing; (2) a wavelength-division multiplexing; (3) a frequency domain modulation; and (4) a pseudo-random code modulation.

18. The interrogation system of claim 15, wherein the detection subsystem further comprises:
at least two local oscillator paths to receive light from the light source, wherein the at least two local oscillator paths have different polarizations, wherein use of the at least two oscillator paths with the different polarizations enables use of a single detector to receive the plural signal portions.

19. The interrogation system of claim 15, wherein the detection subsystem further comprises a balanced detection mechanism to reject common-mode noise.

20. The interrogation system of claim 19, wherein the balanced detection mechanism comprises:
a beam splitter to split the return light signal to form plural return light signal portions;
a 50:50 coupler to split the optical local oscillator light signal to form plural optical local oscillator light signal portions;
additional 50:50 couplers to combine corresponding pairs of the return light signal portions and optical local oscillator light signal portions; and
photoreceivers to receive outputs of the additional 50:50 couplers.

21. The interrogation system of claim 20, wherein one or more of the 50:50 couplers further comprises a controller to govern the relative splitting of the optical local oscillator light signal to a desired value.

22. The interrogation system of claim 21, wherein the controller governs based on a corresponding temperature of the one or more of the 50:50 couplers.

* * * * *